United States Patent
Hodde

(10) Patent No.: US 10,456,999 B2
(45) Date of Patent: Oct. 29, 2019

(54) POSITIONING MEMBER FOR POSITIONING A SEMIFINISHED PRODUCT, METHOD FOR PREPARING THE SEMIFINISHED PRODUCT, AND SEMIFINISHED PRODUCT

(71) Applicant: Bayerische Motoren Werke Aktiengesellschaft, Munich (DE)

(72) Inventor: Jan Hodde, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 115 days.

(21) Appl. No.: 15/355,505

(22) Filed: Nov. 18, 2016

(65) Prior Publication Data
US 2017/0066204 A1    Mar. 9, 2017

Related U.S. Application Data

(63) Continuation of application No. PCT/EP2015/059764, filed on May 5, 2015.

(30) Foreign Application Priority Data

May 20, 2014    (DE) .......................... 10 2014 209 524

(51) Int. Cl.
| | |
|---|---|
| *B29C 70/54* | (2006.01) |
| *D05B 39/00* | (2006.01) |

(Continued)

(52) U.S. Cl.
CPC ............ *B29C 70/543* (2013.01); *B29C 31/08* (2013.01); *B29C 31/085* (2013.01);
(Continued)

(58) Field of Classification Search
CPC ........ D05B 13/02; D05B 39/00; B29C 70/54; B29C 70/543; B29C 70/00; B29C 70/06;
(Continued)

(56) References Cited

U.S. PATENT DOCUMENTS 383,533 A  *  5/1888  Luwig
2,797,179 A  *  6/1957  Kress ................... B29C 43/146
                                                             156/219

(Continued)

FOREIGN PATENT DOCUMENTS

| DE | 23 34 054 A1 | 2/1976 |
|---|---|---|
| DE | 38 89 449 T2 | 9/1994 |

(Continued)

OTHER PUBLICATIONS

International Search Report (PCT/ISA/210) issued in PCT Application No. PCT/EP2015/059764 dated Aug. 17, 2015, with English translation (six (6) pages).

(Continued)

*Primary Examiner* — Ismael Izaguirre
(74) *Attorney, Agent, or Firm* — Crowell & Moring LLP

(57) ABSTRACT

A positioning member for positioning a semifinished product on at least one positioning means in a processing plant for processing the semifinished product. The positioning member may be connected to the semifinished product and may be equipped with at least one arranging element for contacting the positioning means. A semifinished fiber product includes at least one component area forming a component as well as at least one overlapping area for arranging a positioning member. A method for preparing a semifinished product that is arrangeable at least in a processing plant for processing a semifinished product.

16 Claims, 2 Drawing Sheets

(51) Int. Cl.
*B29C 31/08* (2006.01)
*B29C 51/26* (2006.01)
*B29K 105/06* (2006.01)
*B29L 31/30* (2006.01)

(52) U.S. Cl.
CPC ............ *B29C 51/262* (2013.01); *B29C 70/54* (2013.01); *D05B 39/00* (2013.01); *B29K 2105/06* (2013.01); *B29L 2031/3076* (2013.01)

(58) Field of Classification Search
CPC ....... B29C 70/28; B29C 70/545; B29C 31/08; B29C 31/085; B29C 51/26; B29C 51/262; B29C 43/02; B29K 2105/06; B29L 2031/3076; D06C 3/00; D06C 3/08
See application file for complete search history.

(56) References Cited

U.S. PATENT DOCUMENTS

| | | | | |
|---|---|---|---|---|
| 3,263,884 | A * | 8/1966 | Doerfling | B21D 43/021 226/30 |
| 4,070,223 | A * | 1/1978 | Stalzer | B41J 11/26 156/264 |
| 4,621,586 | A * | 11/1986 | Binder | D05B 39/00 112/148 |
| 4,736,535 | A * | 4/1988 | Rucker | D05C 1/02 248/172 |
| 5,154,872 | A * | 10/1992 | Masui | B29C 43/02 264/266 |
| 5,429,853 | A | 7/1995 | Darrieux | |
| 5,636,866 | A * | 6/1997 | Suzuki | B60R 21/04 188/376 |
| 6,030,568 | A | 2/2000 | Vestergaard | |
| 6,041,639 | A * | 3/2000 | Pacher | B21D 25/02 72/294 |
| 6,164,634 | A * | 12/2000 | Farlow | H05K 13/0069 269/47 |
| 6,913,356 | B2 * | 7/2005 | Belly | B24B 13/0052 351/159.73 |
| 7,603,770 | B2 * | 10/2009 | Brandenburg | H05K 3/284 264/272.11 |
| 8,932,499 | B2 * | 1/2015 | Goedecke | B29C 33/68 264/257 |
| 2004/0026025 | A1 | 2/2004 | Sana et al. | |
| 2013/0164503 | A1 | 6/2013 | Hayse | |

FOREIGN PATENT DOCUMENTS

| | | |
|---|---|---|
| DE | 693 01 162 T2 | 5/1996 |
| DE | 10 2010 054 097 A1 | 6/2012 |
| DE | 10 2012 010 497 A1 | 12/2012 |
| DE | 10 2012 019 915 A1 | 4/2014 |
| EP | 0 347 503 A1 | 12/1989 |
| GB | 1 509 915 | 5/1978 |

OTHER PUBLICATIONS

German-language Written Opinion (PCT/ISA/237) issued in PCT Application No. PCT/EP2015/059764 dated Aug. 17, 2015 (six (6) pages).

German Search Report issued in counterpart German Application No. 10 2014 209 524.7 dated Jan. 18, 2016, with partial English translation (ten (10) pages).

* cited by examiner

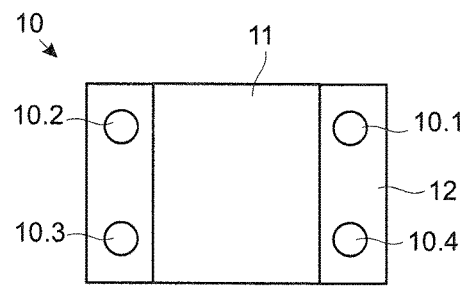
Fig. 3
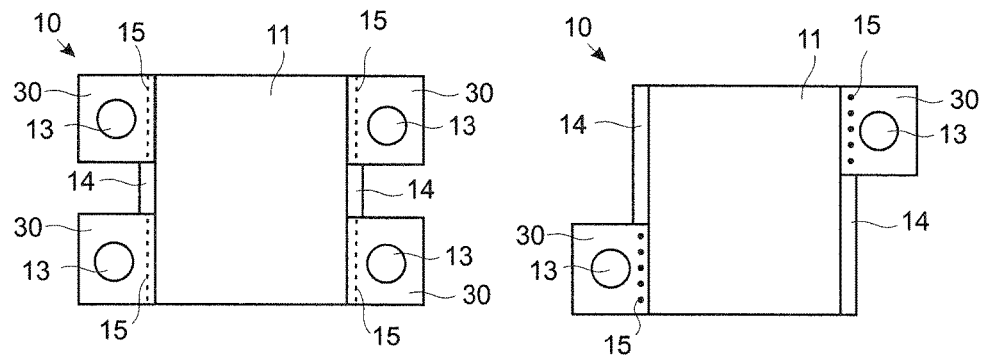
Fig. 4a　　　　Fig. 4b
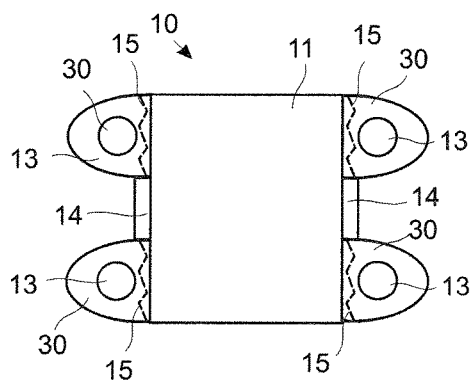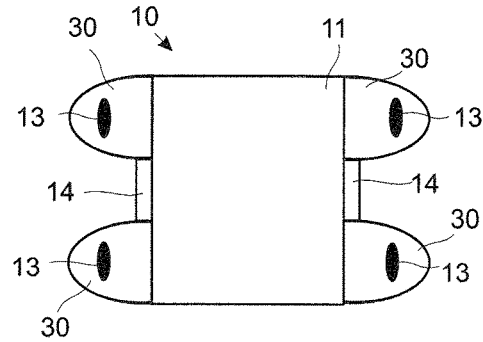
Fig. 5a　　　　Fig. 5b

POSITIONING MEMBER FOR POSITIONING A SEMIFINISHED PRODUCT, METHOD FOR PREPARING THE SEMIFINISHED PRODUCT, AND SEMIFINISHED PRODUCT

CROSS REFERENCE TO RELATED APPLICATIONS

This application is a continuation of PCT International Application No. PCT/EP2015/059764, filed May 5, 2015, which claims priority under 35 U.S.C. § 119 from German Patent Application No. 10 2014 209 524.7, filed May 20, 2014, the entire disclosures of which are herein expressly incorporated by reference.

BACKGROUND AND SUMMARY OF THE INVENTION

The embodiments of the present invention relate to a positioning member for positioning a semifinished product at least on at least one positioning means of a processing plant for processing the semifinished product. Furthermore, the embodiments of the present invention relate to a semifinished product and in particular a semifinished fiber product, and to a method for preparing a semifinished product that can be arranged in a processing plant for processing a semifinished product.

In handling of semifinished products, such as in particular impregnated semifinished products and advantageously impregnated semifinished fiber products, for example grippers are used, which clamp the semifinished product in the edge regions thereof and consequently can be designated as clamping grippers. Furthermore, in specific areas of the semifinished products, holes and in particular through holes are introduced, through which it is possible to introduce corresponding positioning pins of a handling device, such as a transport device for transporting the semifinished products from, for example, one processing plant to another processing plant. These holes or apertures in the fiber material of the semifinished product are consequently used for positioning during the transport of the semifinished product and advantageously also for positioning the semifinished product within a processing plant, which consequently has geometrically comparably configured positioning pins, in order to hold the semifinished product in a defined and in particular predetermined position during the processing thereof.

Semifinished products and in particular impregnated semifinished fiber products are used in particular in aircraft construction, in space travel and also in automobile construction and, as is known, are designated as pre-pregs. Pre-pregs are predominantly flat two-dimensional fiber structures which, in a continuous process, are impregnated with a matrix system in the desired matrix-reinforcing fiber ratio. Thus, two textile fabrics, such as the unidirectional pre-preg, in which all the fibers in the layer are oriented in parallel are used, and secondly fabric pre-pregs with a row of different types of fabric are used. The industrial production of corresponding semifinished products and in particular impregnated fiber composite material semifinished products is carried out in a known way by, for example, hand lamination in the wet pressing process, in the pre-preg pressing process or in the resin infusion process, such as, for example, the resin transfer molding (RTM) process. In all the aforementioned processes, the semifinished product made of synthetic fibers, for example, is laid in an impregnating tool and in particular an impregnating device and soaked or sprayed with an impregnating agent, such as an impregnating resin, wherein the impregnating agent penetrates through the voids between the fibers and envelops the latter. Following the impregnating process, the semifinished product impregnated with the impregnating agent is laid in a corresponding molding tool for pressing the semifinished product, which can also be designated as consolidation device. During this pressing operation, in particular the structure of the impregnated semifinished fiber product is cross-linked and the semifinished product is molded. During these corresponding processing processes, and also for the transport of the semifinished product from, for example, the impregnating device to the consolidation device, the semifinished products are held by means of the positioning pins. Consequently, these positioning pins extend through corresponding cutouts in the semifinished products, at least in some sections.

In order to permit the aforementioned processing processes of the semifinished product, these cutouts must be present outside a component area of the semifinished product which is present following the trimming. Disadvantageously, as a result the blank of the semifinished product is consequently designed to be dimensionally larger than it actually has to be for the region used for the component produced. The consequentially over-dimensioned semifinished product disadvantageously leads to an increase in the production costs and to an increase in the wastage, wherein the wastage is in particular the area of the semifinished product which is used with the cutouts for positioning the semifinished product during the transport and/or during the processing.

It is therefore one object of the embodiments of the present invention to eliminate the previously described disadvantages in a semifinished product and in particular an impregnated semifinished fiber product. In particular, the embodiments of the present invention, inter alia, provide a member and a semifinished product by means of which, in a simple and economical way, positioning of the semifinished product during the transport and also during the processing or machining of the semifinished product within a corresponding processing plant is made possible.

The above object is achieved by a positioning member for positioning a semifinished product at least on at least one positioning means of a processing plant for processing the semifinished product, and by a semifinished product, in particular a semifinished fiber product. Furthermore, the above object is achieved by a method for preparing at least one semifinished product that can be arranged in a processing plant for processing a semifinished product. Further features and details of the embodiments of the invention emerge from the sub claims, the description and the drawings. Here, features and details which are described in connection with the positioning member of course also apply in connection with the semifinished product according to the embodiments of the invention and/or the method according to the invention for preparing a semifinished product and respectively vice versa, so that, with respect to the disclosure relating to the individual aspects of the invention, reference is or can always be made mutually.

The positioning member according to the embodiments of the invention for positioning a semifinished product at least on at least one positioning means of a processing plant for processing the semifinished product can be connected to the semifinished product and has at least one arranging element for contacting the positioning means. Advantageously, the semifinished product is a semifinished fiber product and in particular a fiber composite semifinished product, such as, for example, a carbon fiber composite semifinished product which has reinforcing fibers and a plastic matrix. Here, the plastic matrix advantageously surrounds the reinforcing fibers, which are attached to the matrix by adhesive or cohesive forces. By means of the use of fiber materials, fiber-plastic composites have in particular a directionally dependent elasticity behavior. For the semifinished product, it is possible to use as reinforcing fibers, for example, inorganic reinforcing fibers, such as basalt fibers, boron fibers, glass fibers, ceramic fibers, or metallic reinforcing fibers, such as steel fibers, or organic reinforcing fibers, such as aramid fibers, carbon fibers, polyester fibers, nylon fibers, or natural fibers, such as in particular flax fibers, hemp fibers, wood fibers or sisal fibers. As the matrix system of the semifinished product, it is possible to use, for example, a thermoplastic matrix system, having in particular polyether ether ketone (PEEK), polyphenylene sulfide (PPS), polysulfone (PSU), polyether imide (PEI), polytetrafluoroethylene (PTFE), epoxy resin, amino resin or else vinyl resins. Likewise, for example, an elastomer matrix system or a thermosetting matrix system, for example having rubber or polyurethane, is possible as matrix system.

A processing plant for processing the semifinished product is, for example, an injection plant or impregnation plant for applying the plastic matrix and in particular an impregnating resin to the reinforcing fibers and in particular reinforcing fiber mats. Furthermore, it is conceivable that the processing plant is also a consolidation plant, which is used in particular for shaping the semifinished product and for cross-linking the fiber structure of the semifinished product, wherein the consolidation plant is in particular a press plant. The processing plant advantageously has a positioning means, by means of which the semifinished product can be arranged and positioned on the plant and advantageously locked. The positioning means itself can be configured in an extremely wide range of forms. Thus, it is conceivable for the positioning means to be a pin or dowel, for example, or else configured in the form of a gripping element or clamping element. It is also conceivable that the positioning member according to the embodiments of the invention is not just used for positioning the semifinished product on a positioning means in a processing plant but in particular also for positioning on corresponding positioning means or holding means or arranging means of a transport device or a transport system which is used to transport the semifinished product from, for example, a first processing plant to a second processing plant. Advantageously, the positioning means or the holding means or receiving means of the transport device likewise have a pin-like or dowel-like form or are configured in the form of gripping elements or clamping elements or the like, in order to hold the semifinished product in a defined position at least during the transport from, for example, one processing plant to another processing plant. The positioning member is consequently advantageously a fit-on part which, in addition to the semifinished product, can be arranged detachably or else non-detachably on the semifinished product. Advantageously, the positioning member itself has a material of lower quality than the material of the semifinished product, in order to be able to be produced in a simple and economical way. The positioning member is advantageously reusable.

Thus, it is conceivable that the positioning member according to the embodiments of the invention is configured to be plate-like, lug-like, film-like, belt-like, sheet-like or to have a comparable shape. It is also possible that the positioning member has a material thickness which is lower or else thicker than the material thickness of the semifinished product. Advantageously, the positioning member can be removed without damage from the semifinished product following the production of the final component or component, in order consequently to be able to be reused. Advantageously, the positioning member according to the embodiments of the invention consequently has a shape such that, starting from the semifinished product, the positioning member can extend away outward from the latter, in order as an additional fit-on part to permit positioning of the semifinished product on a processing plant and/or on a transport system or device.

Within the context of the embodiments of the invention, it is possible that the positioning member has a plastic material, a fiber reinforced plastic material, a cellulose material, a metallic material, a nonmetallic material, a ceramic material, an organic material and/or an inorganic nonmetallic material. Thus, it is conceivable that the positioning member has, for example, a cellulose material, in particular a paper material. As a nonmetallic material, it is advantageously possible to use, for example, wood or graphite, whereas as metallic material, for example, iron, steel, copper or else aluminum can be used. If, for example, the positioning member has an organic material, then it is conceivable that the positioning member has a wood material or else a plastic material, while, for example, ceramic or glass can be used as inorganic nonmetallic material. Advantageously, the positioning member has at least one material of lower quality, wherein in particular the material is at least more economical than the material used for the semifinished product. The use of the material of the positioning member is in particular necessitated by the material of the semifinished product and also by the use of the joining method or connecting method between the positioning member and the semifinished product.

Advantageously, the positioning member has an arranging element for contacting the positioning means. Within the context of the invention, it is consequently conceivable that the arranging element is a hole and in particular a through hole. If the arranging element is such a hole or through hole, it is conceivable that the positioning means of the processing plant and/or the transport system extends through this hole, at least in some sections, or engages in this hole, wherein in this case the positioning means is advantageously then a pin or dowel or a rod-like element. It is also conceivable that the arranging element is also a recess with or without corresponding undercut(s) or a projection, such as a lug or a hook, which is consequently suitable for arranging or contacting a corresponding positioning means. In this case, it is conceivable that the positioning means itself is a gripping element or a clamping element which can grip the projection or engage in a recess. The configuration and geometric shape of the arranging element is not intended to be restricted within the context of the embodiments of the invention. Thus, it is conceivable that the arranging element, in addition to a configuration as a recess or hole or else as an elevation or projection, can also have a round, oval or angular, in particular rectangular, geometric shape. The geometric configuration of the arranging element depends in particular on the configuration of the positioning means of the processing plant or the transport system. Advantageously, the transport system has a positioning means that is identical to the processing plant, so that a simple transfer of the semifinished product from the transport system to the processing plant can be made possible.

Advantageously, the positioning member can be arranged on at least one overlapping area of the semifinished product by means of a detachable or non-detachable connecting means. Within the context of the embodiments of the invention, a detachable connecting means can be understood to be, for example, a screw connection, a touch and close connection, a thread or else riveting. By contrast, for example an adhesive means, a welding means or a soldering means can serve as a non-detachable connecting means. However, it is also conceivable that the connection between the positioning member and the overlapping area of the semifinished product is made possible without a separate connecting means, wherein in particular folding, clinching or welding can be used as a connecting method. The overlapping area of the semifinished product is advantageously a semifinished product area which later does not belong to the final component and which is used to connect the positioning member to the semifinished product. The overlapping area is removed from this final component again, together with the positioning member, following the production of the final component. Advantageously, the overlapping area of the semifinished product is dimensioned to be small such that, although an arrangement of the positioning member and a connection of the positioning member to the overlapping area of the semifinished product can be made possible, on the other hand as little wastage as possible is produced during the removal of the overlapping area from the final component, in order to keep the production costs of the semifinished product and in particular of the finished final component as low as possible.

Within the context of the embodiments of the invention, it is also possible that the connecting means is a thread element for sewing the positioning member to at least one section of the overlapping area. Advantageously, it is consequently conceivable that the positioning member is connected to the overlapping area of the semifinished product by using a sewing system and in particular a 2D portal sewing system. A portal sewing system operates, for example, with at least one sewing head and advantageously with a multiplicity of sewing heads. The positioning member can advantageously be connected to the overlapping area of the positioning member by means of a back stitch, blind stitch (single-thread) chain stitch, a double stitch and so on. The thread element used, for example, is a connecting thread, such as, in particular, a yarn, a glass fiber thread, a polyester thread or else an aramid thread. It is also conceivable that the overlapping area and/or the positioning member itself already has apertures and in particular holes and is consequently pre-processed in a defined form. The thread element can advantageously be drawn through these pre-punched or pre-drilled apertures, so that a connection is made by means of threading the thread element into the holes of the overlapping area or the positioning member.

It is also possible that the positioning member can be tacked, bonded, clinched, clipped, riveted, folded, stuck, welded to or arranged on at least one overlapping area of the semifinished product by using a comparable connecting method. The aforementioned connecting methods can be used alternatively or additionally to the sewing of the positioning member to the overlapping area. Depending on the use of the appropriate connecting method or joining method, a corresponding connecting means is used, so that, for example in the case of adhesive bonding of the positioning member to the overlapping area, an adhesive is consequently used as connecting means. This is correspondingly true of the connecting method of riveting, wherein appropriate rivets are used as connecting means.

Also disclosed is a semifinished product and in particular a semifinished fiber product, which has at least one component area forming a component and at least one overlapping area for the arrangement of a positioning member, wherein the overlapping area extends away outward, at least in some sections, starting from the component area. Consequently, the semifinished product according to the embodiments of the invention has an overlapping area on which a positioning member according to the preceding type can be arranged. It is conceivable that the semifinished product according to the embodiments of the invention is a pre-form having reinforcing fibers, which is impregnated with an impregnating agent, such as an impregnating resin, in a corresponding injection plant or impregnation plant, in order to produce a corresponding fiber composite semifinished product. It is also conceivable that the semifinished product according to the embodiments of the invention has an overlapping area which is advantageously between about 0.1 cm to about 2.0 cm and particularly advantageously between about 0.5 cm to about 1.0 cm wide and advantageously extends in this width away from the component area of the semifinished product. The overlapping area of the semifinished product is advantageously a constituent part of the semifinished product and consequently has an identical material to that of the component area of the semifinished product. It is also conceivable that the overlapping area is preprocessed and/or, for example, has a lower material thickness than the component area and/or, for example, has holes or apertures through which, for example, the aforementioned thread element can be led in order to connect the positioning member to the overlapping area of the semifinished product. Depending on the required or desired arrangement of a positioning member, the overlapping area can be arranged or formed on one side or else on multiple sides of the semifinished product. Thus, it is conceivable that the semifinished product has in particular two opposite overlapping areas which, starting from the component area of the semifinished product which, in particular, forms a central region of the semifinished product, extend away outward. It is also conceivable that the overlapping area extends in the circumferential direction around the semifinished product. The spreads or extents of the overlapping area are dependent in particular on the individual shape of the semifinished product and also on the arrangement of the semifinished product within the processing plant or in the region of the transport system. This means that, depending on the configuration of the processing plant or the transport system and also depending on the geometric form of the semifinished product itself, a corresponding overlapping area is formed or remains, on which at least one positioning member and advantageously at least two substantially opposite positioning members are arranged.

In the case of the semifinished product described, all the advantages which have already been described in relation to a positioning member according to an embodiment of the invention result.

Also claimed is a method for preparing a semifinished product that can be arranged at least in a processing plant for processing a semifinished product, in which a positioning member is arranged on the semifinished product, overlapping an overlapping area of the semifinished product, at least in some sections, and is connected to the overlapping area by using a connecting method in such a way that the at least one arranging element of the positioning member is arranged at a defined distance from the component area of the semifinished product. Consequently, according to the method, a semifinished product of the preceding type is prepared in order to be able to be arranged at least in a processing plant for processing the semifinished product or to be able to be transported from, for example, one processing plant to at least one other processing plant by means of a transport system or transport device. Here, a positioning member of the preceding type is arranged on this semifinished product, at least in some sections, overlapping an overlapping area of the semifinished product, in which the positioning member is connected detachably or else non-detachably to the semifinished product by using a connecting method such as, in particular, a sewing method, welding method, riveting method and so on. It is conceivable that at least one positioning member is arranged on the overlapping area of the semifinished product, in which advantageously at least two and more positioning members are arranged on one or multiple corresponding overlapping areas of the semifinished product. In processing plants or transport systems, the positioning means are arranged at a distance from one another, wherein the semifinished product is normally arranged between the positioning means in order to lock the same in a defined position, at least during the processing operation or the transporting operation. Accordingly, the semifinished product which is to be arranged on the processing plant advantageously also has correspondingly arranged positioning members which, consequently, can later interact with the positioning means of the processing plant or with the positioning means of the transport system, or can be gripped by the positioning means of the processing plant or the transport system. As a result, the arrangement of the positioning means on the semifinished product is advantageously carried out whilst taking account of the configuration of the processing plant or the transport system and in particular the arrangement and configuration of the positioning means of the processing plant or the positioning means of the transport system. Advantageously, in the method according to the embodiments of the invention, following the arrangement of the semifinished product on the positioning member or following the arrangement of the at least one positioning member on the overlapping area of the semifinished product, a joining method or connecting method is used in order to produce a detachable or else non-detachable connection between the positioning member and the semifinished product and in particular the overlapping area of the semifinished product.

Thus, it is conceivable that the positioning member is sewn to the overlapping area by means of a sewing system by using a thread element. The sewing system used is, for example, a 2D portal sewing system wherein, as already previously mentioned, it is possible to use as thread element a connecting thread, such as a yarn, a glass fiber thread, a polyester thread or else an aramid thread, for example. Advantageously, when a sewing method is used, simple separation of the positioning member from the overlapping area or from the semifinished product is made possible, in particular since only the thread element needs to be destroyed in order to be able to remove the positioning member from the overlapping area and in particular from the semifinished product again.

In the case of the method described, all the advantages which have already been described in relation to a positioning member and/or a semifinished product according to the preceding aspects of the embodiments of the invention result.

A processing plant and a transport device and also a positioning member according to the embodiments of the invention and a semifinished product according to the embodiments of the invention will be explained in more detail below by using drawings, in which, in each case schematically:

Other objects, advantages and novel features of the embodiments of the invention will become apparent from the following detailed description of one or more preferred embodiments when considered in conjunction with the accompanying drawings.

BRIEF DESCRIPTION OF THE DRAWINGS

FIG. 3 is a plan view of a semifinished product,
FIG. 4a is a plan view of an embodiment of a semifinished product with positioning members,
FIG. 4b is another plan view of a semifinished product with positioning members,
FIG. 5a is another plan view of a semifinished product with positioning members,
and
FIG. 5b is another plan view of a semifinished product with positioning members.

DETAILED DESCRIPTION OF THE DRAWINGS

Elements with the same function and action are each provided with the same designations in FIGS. 1 to 5b.

Figure 1:
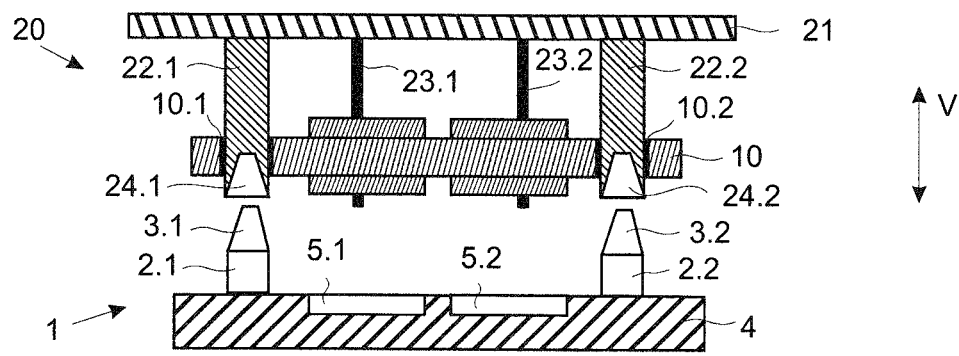
FIG. 1 is a side view of a sectional illustration of a semifinished product arranged on a transport system.

In FIG. 1, a sectional illustration of a semifinished product 10 arranged on a transport device 20 is shown in a side view. The transport device 20 or transport system 20 has a carrier element 21, from which holding means 22.1 and 22.2 extend away substantially in the vertical direction V. The holding means 22.1 and 22.2 are advantageously configured in the form of holding pins or holding dowels, which each have cutouts 24.1 and 24.2, which are used to hold corresponding engagement regions 3.1, 3.2 of the positioning means 2.1, 2.2 of a processing plant 1. Furthermore, it is conceivable that the transport system 20 has locking means 23.1 and 23.2, which also extend substantially underneath and along the semifinished product 10, at least in some regions, in order to hold and in particular to lock the latter during transport of the semifinished product 10, for example, from a first processing plant, as shown in FIG. 1, to a further processing plant and so on.

The processing plant 1 shown in FIG. 1, which is a consolidation plant, for example, may have a supporting element 4 for the arrangement of the semifinished product 10. Starting from a surface of the supporting element 4, the positioning means 2.1 and 2.2 extend substantially away upward in the vertical direction V in the direction of the transport system 20 in order to come into engagement with the holding means 22.1 and 22.2 of the transport system 20 and in particular the cutouts 24.1 and 24.2 of the latter. In order to permit an arrangement of the semifinished product 10 on the holding means 22.1 and 22.2 of the transport system 20 and/or on the positioning means 2.1 and 2.2 of the processing plant 1, the semifinished product 10 has holes 10.1 and 10.2, through which, during the transport of the semifinished product 10 by means of the transport system 20, the holding means 22.1 and 22.2 extend and, during the processing of the semifinished product 10 by means of the processing plant 1, the positioning means 2.1 and 2.2 extend, at least in some sections. Furthermore, the supporting element 4 of the processing plant 1 has depressions or recesses 5.1 and 5.2, within which specific areas of the semifinished product 10 can be introduced and arranged.

Figure 2:
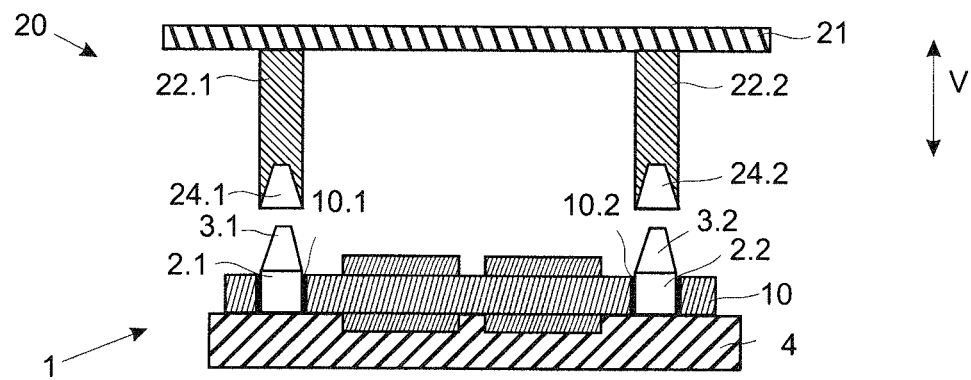
FIG. 2 is a side view of a sectional illustration of a semifinished product arranged on a processing plant.

The arrangement and supporting of the semifinished product 10 on the supporting element 4 of the processing plant 1 is shown in particular in FIG. 2. Here, it is clearly shown how the positioning means 2.1 and 2.2 of the processing plant 1, reach through the corresponding holes 10.1 and 10.2 of the semifinished product 10 and extend through the latter when the transport system 20 has transferred the semifinished product 10 to the processing plant 1. Consequently, the transport system 20 and the processing plant 1 advantageously have geometrically mutually comparatively configured positioning means 2.1 and 2.2 and holding means 22.1 and 22.2, in order to permit a simple and reliable transfer of the semifinished product 10 from the transport system 20 to the processing plant 1.

The configuration of a semifinished product 10 having corresponding holes 10.1 and 10.2 is illustrated in particular in FIG. 3. The semifinished product 10, shown schematically in a plan view, has a component area 11 and a trim area 12 with corresponding holes 10.1, 10.2, 10.3, 10.4, through which, at least in some sections, the positioning means 2.1, 2.2 and/or the holding means 22.1 and 22.2 extend, as shown in FIGS. 1 and 2. The trim area 12 is in particular a constituent part of the semifinished product 10, just like the component area 11, and consequently has an identical material to the component area 11. Following the processing of the semifinished product 10 within the impregnation plant or the consolidation plant, it is necessary to separate the trim area 12 from the component area 11 in order to produce the finished component. Disadvantageously, a large quantity of semifinished product material is thrown away as wastage as a result, which means the production costs of the semifinished product 10 are increased.

In FIGS. 4a to 5b, different semifinished products 10 with positioning members 30 arranged appropriately on the semifinished product 10 are shown. The semifinished product 10 has a component area 11 and an overlapping area 14. The overlapping area 14 is advantageously a constituent part of the semifinished product 10, which accordingly has the same material as the component area 11. The overlapping area 14 extends away outward, starting from the component area 11, and has a width which is lower in such a way that an arrangement of the positioning member 30 on the overlapping area 14 is advantageously just still possible.

As shown in FIG. 4a, the semifinished product 10 may have four positioning members 30, which are arranged at a distance from one another on at least two overlapping areas 14 of the semifinished product 10. Each positioning member 30 advantageously has an arranging element 13 which, for example, as shown in FIG. 4a, can be configured in the form of a hole and in particular a through hole. The positioning members 30 are advantageously configured in the form of a rectangle or a square and are connected to the overlapping area 14 by means of a connecting means 15. The connecting means 15 can be, for example, a thread element, such as in particular a connecting thread. Here, it is conceivable that the positioning member 30 or the four positioning members 30 are fitted to the overlapping area 14 of the semifinished product 10 by using a sewing system and in particular a 2D portal sewing system. However, it is also conceivable that four positioning elements 30, in particular in each end region of the semifinished product 10, are not arranged, but only two positioning members 30, as shown in particular in FIG. 4b. It is also conceivable that only one positioning member 30 or else more than four positioning members 30 are arranged and in particular connected to the overlapping area 14 of the semifinished product 10.

Furthermore, in FIG. 4b, a riveted connection or else a screw connection is indicated schematically as connecting means 15. This means that it is conceivable that, besides a connecting thread or thread element, connecting means configured in other ways can also be used. The arrangement of the positioning member 30 on an overlapping area 14 of the semifinished product 10 depends in particular on the geometric configuration of the semifinished product 10 and also depends on the arrangement of the positioning means 2.1 and 2.2 and/or the holding means 22.1 and 22.2, as shown in particular in FIGS. 1 and 2. Advantageously, however, at least two positioning members 30 are used which, in particular as viewed in the circumferential direction of the semifinished product 10, are arranged on mutually opposite sides and advantageously extending substantially parallel to each other in one plane.

Further embodiments of the semifinished product with positioning members 30 arranged on overlapping areas 14 are shown in FIGS. 5a and 5b, wherein the positioning members 30 shown in FIGS. 5a and 5b do not have an angular but a round and in particular oval geometric shape. In particular in FIG. 5a, the positioning members 30 are connected to the overlapping area 14 of the semifinished product 10 by means of a zigzag seam using a thread element as connecting means 15. By contrast, the positioning members 30 of the semifinished product 10 shown in FIG. 5b have no arranging elements 13 configured in the form of holes and in particular a through hole. Instead, the arranging elements 13 are configured in the form of projections or elevations, which can be gripped and held by corresponding positioning means of the processing plant or holding means of the transport system configured as gripping elements or clamping elements. According to the semifinished product 10 that is shown in FIG. 5b, it is also conceivable to connect the positioning means 32 to the overlapping areas 14 of the semifinished product by means of an adhesive, for example. Consequently, the connecting means 15, which is not visible here, is an adhesive. It is also conceivable that the positioning means 30 are also welded to the overlapping areas 14 of the semifinished product 10.

LIST OF DESIGNATIONS

1 Processing plant
2.1, 2.2 Positioning means
3.1, 3.2 Engagement area of the positioning means
4 Supporting element
5.1, 5.2 Depression in the supporting element
10 Semifinished product
10.1, 10.2, 10.3, 10.4 Hole
11 Component area
12 Trim area
13 Arranging element
14 Overlapping area
15 Connecting means
20 Transport system
21 Carrier element
22.1, 22.2 Holding means of the transport system
23.1, 23.2 Locking means of the transport system
24.1, 24.2 Cutout of the holding means
30 Positioning member
V Vertical direction The foregoing disclosure has been set forth merely to illustrate the embodiments of the invention and is not intended to be limiting. Since modifications of the disclosed embodiments incorporating the spirit and substance of the embodiments of the invention may occur to persons skilled in the art, the embodiments of the invention should be construed to include everything within the scope of the appended claims and equivalents thereof.

What is claimed is:

1. A positioning system, comprising:
   a semifinished product;
   a processing plant configured to process the semifinished product;
   a supporting element on which the semifinished product is disposed;
   at least one positioning means that extends vertically from the supporting element; and
   a positioning member configured to position the semifinished product on the at least one positioning means of the processing plant, wherein
   the positioning member is connectable to the semifinished product and has at least one arranging element that contacts the positioning means.

2. The positioning system as claimed in claim 1, wherein the positioning member is configured to be a plate, a lug, a film, a belt, or a sheet.

3. The positioning system as claimed in claim 1, wherein the positioning member has a plastic material, a fiber reinforced plastic material, a cellulose material, a metallic material, a nonmetallic material, a ceramic material, an organic material and/or an inorganic nonmetallic material.

4. The positioning system as claimed in claim 3, wherein the arranging element is a through hole.

5. The positioning system as claimed in claim 4, wherein the positioning member is arranged on at least one overlapping area of the semifinished product via of a detachable or non-detachable connecting means.

6. The positioning system as claimed in claim 5, wherein the connecting means is a thread element for sewing the positioning member to at least one section of the overlapping area.

7. The positioning system as claimed in claim 1, wherein the positioning member is tacked, bonded, clinched, clipped, riveted, folded, fastened, welded to, or disposed on at least one section of the overlapping area of the semifinished product via a connecting method.

8. A semifinished product, in particular a semifinished fiber product, having at least one component area forming a component and at least one overlapping area for the arrangement of a positioning system as claimed in claim 7, wherein the overlapping area extends away, at least in some sections, starting from the component area.

9. A method for preparing a semifinished product that is arrangeable at least in a processing plant for processing a semifinished product and is a semifinished fiber product, having at least one component area forming a component and at least one overlapping area for the arrangement of a positioning member for positioning a semifinished product on at least one positioning means of a processing plant for processing the semifinished product, wherein the positioning member is connectable to the semifinished product and has at least one arranging element that contacts the positioning means, the positioning member being at least one of tacked, bonded, clinched, clipped, riveted, folded, fastened, welded to, or disposed on at least one section of the overlapping area of the semifinished product via a connecting method, wherein the overlapping area extends away, at least in some sections, starting from the component area, the method comprising:
   providing a supporting element;
   arranging the positioning member on the semifinished product so as to overlap an overlapping area of the semifinished product, at least in some sections; and
   connecting the positioning member to the overlapping area in such a way that the at least one arranging element of the positioning member is arranged at a defined distance from the component area of the semifinished product, wherein
   the positioning member is sewn to the overlapping area via a sewing system by using a thread element,
   the semifinished product is disposed on the supporting member, and
   the at least one positioning means extends vertically from the supporting element.

10. A positioning member for positioning a semifinished product on at least one positioning means of a processing plant for processing the semifinished product, wherein
    the positioning member is connectable to the semifinished product and has at least one arranging element that contacts the positioning means,
    the connecting means is a thread element for sewing the positioning member to at least one section of the overlapping area,
    the semifinished product is disposed on a supporting member, and
    at least one positioning means extends vertically from the supporting element.

11. The positioning member as claimed in claim 10, wherein
    the positioning member is configured to be a plate, a lug, a film, a belt, or a sheet.

12. The positioning member as claimed in claim 10, wherein
    the positioning member has a plastic material, a fiber reinforced plastic material, a cellulose material, a metallic material, a nonmetallic material, a ceramic material, an organic material and/or an inorganic nonmetallic material.

13. The positioning member as claimed in claim 12, wherein the arranging element is a through hole.

14. The positioning member as claimed in claim 13, wherein
    the positioning member is arrangeable on at least one overlapping area of the semifinished product via of a detachable or non-detachable connecting means.

15. The positioning member as claimed in claim 10, wherein
    the positioning member is tacked, bonded, clinched, clipped, riveted, folded, stucked, welded to, or disposed on at least one section of the overlapping area of the semifinished product via a connecting method.

16. A semifinished product, in particular a semifinished fiber product, having at least one component area forming a component and at least one overlapping area for the arrangement of a positioning member as claimed in claim 15, wherein the overlapping area extends away outward, at least in some sections, starting from the component area.

* * * * *